No. 737,962.                                              Patented September 1, 1903.

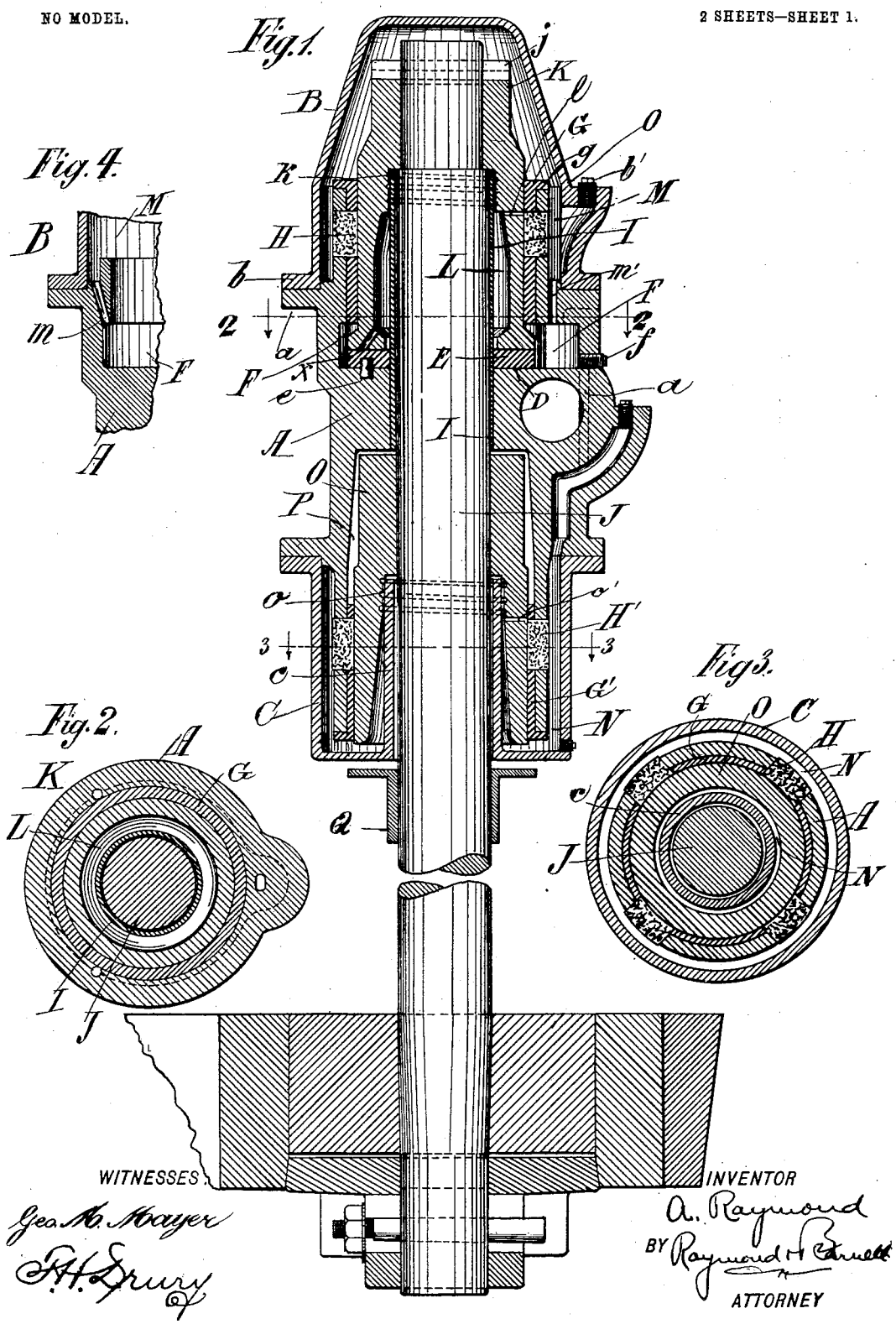

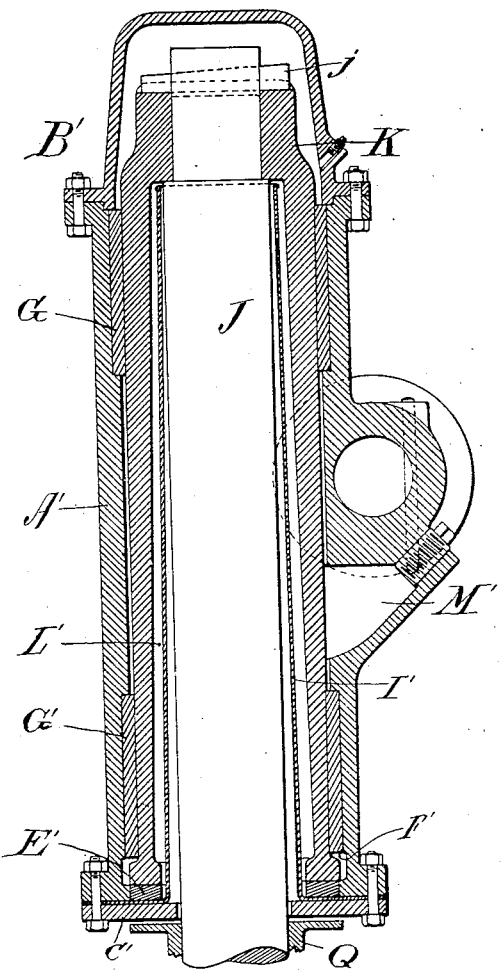

UNITED STATES PATENT OFFICE.

ALBERT RAYMOND, OF CHICAGO, ILLINOIS; MARY M. BARTELME ADMINISTRATRIX OF SAID RAYMOND, DECEASED.

JOURNAL-BEARING.

SPECIFICATION forming part of Letters Patent No. 737,962, dated September 1, 1903.

Application filed May 19, 1902. Serial No. 108,039. (No model.)

*To all whom it may concern:*

Be it known that I, ALBERT RAYMOND, a citizen of the United States, residing at Chicago, in the county of Cook and State of Illinois, have invented certain new and useful Improvements in Journal-Bearings, of which the following is a specification.

My invention relates more particularly to journal-bearings adapted for use in pulverizing-mills or in like situations where the bearing is more or less exposed to a cloud of finely-pulverized material, and especially where the bearing supports a rotatable shaft which is mounted within but does not extend through the bearing.

The object of my invention is to provide such a bearing which shall be simple and durable in construction, readily accessible and yet dust-proof, and which shall be provided with oil-chambers so arranged that the movable portions of the bearing shall constantly rotate within a body of oil.

These and such other objects as may hereinafter appear are attained by the devices illustrated in the accompanying drawings, in which—

Figure 1 is a vertical sectional view of my improved bearing. Fig. 2 is a cross-section on the line 2 2 of Fig. 1 looking in the direction indicated by the arrows. Fig. 3 is a like section on the line 3 3 of Fig. 1, looking in the direction indicated by the arrows. Fig. 4 is an enlarged detail of a modification, and Fig. 5 shows a modified form of my invention.

Referring by letter to the accompanying drawings, my improved journal-box consists of a body-casing A, a top cap B, and a bottom cap C. The casing A is provided with a centrally-disposed cylindrical opening, which is surrounded at its upper end by the shoulder D, upon which is mounted a brass or bearing E. This brass or bearing may be held against rotation in any suitable manner—as, for instance, by means of the dowel-pin $e$. The opening within the upper portion of the casing A, in which the bearing E is mounted, is enlarged to form an oil-chamber F. Fitted within the upper portion of the casing A is a bearing G. This side bearing is preferably provided at its upper end with an annular shoulder $g$, which rests upon the upper end of the casing A and is supported thereby. The bearing G is provided at intervals with openings which communicate with corresponding openings through the casing A. Within these openings in the bearing G are fitted pads H of any suitable material for conveying oil by capillary action.

I is a cylindrical sleeve which is tightly fitted within the central opening through the casing A and extends upward around the shaft J to a point adjacent to the upper end of the casing A. The shaft J is provided adjacent to its upper end with a bearing-sleeve K, which is secured to the shaft by a key $j$ or in any other suitable manner. This bearing-sleeve supports the shaft and extends downwardly within and in contact with the bearing G and rests upon the end-thrust bearing E. Within its lower portion the bearing-sleeve K is cut away to form an oil-chamber L, surrounding the sleeve I.

The body-casing A is provided with an external annular shoulder $a$, upon which rests a corresponding annular shoulder $b$ at the lower end of the upper cap B. The internal diameter of the lower portion of the cap B is somewhat greater than the external diameter of the upper end of the casing A, thereby providing an oil-chamber M, surrounding the upper end of the casing A. The cap B is provided with an oil-feed opening $b'$, leading to this oil-chamber M. The bearing-sleeve K is provided internally with a spiral oil-duct $k$, extending downwardly from a point adjacent to the upper end of the sleeve I.

The oil-chamber F is provided with an outlet $f$, through which surplus oil, dirt, and the like may be drawn off from the bottom of said oil-chamber. The feed-opening $b'$ and the discharge-opening $f$ are normally kept closed in any suitable manner.

From the foregoing description it will be seen that when oil is fed into the feed-opening $b'$ it will fill the oil-chambers F M and finding its way between the bottom of the bearing-sleeve K and the bearing E will work into and fill the oil-chamber L, whence it may flow over the top of the sleeve or dam I and thence downwardly between said sleeve I and the shaft J.

With this arrangement the bearing-sleeve

K will always rotate within the bearing G and upon the bearing E while surrounded by a body of oil which extends to the top of the bearing G. The oil will not only work its way between the bearing G and the sleeve K, but its feed to this point will be facilitated by the capillary action of the oil-pads H. It is well known, however, that when a journal-box of this class is mounted upon the periphery of a spider, which in turn is mounted upon and rotated by a main shaft, the tendency of the centrifugal force thus generated is to throw the oil to one side of the journal-box. This might have a tendency to cause an undue flow of the oil over the sleeve or dam I at one side of the shaft J. To meet this contingency, I have provided the spiral oil-duct $k$, leading downwardly from a point adjacent to the top of the sleeve I, so that as the bearing-sleeve K, which is provided with this spiral oil-duct, revolves within the journal-box the action of the spiral oil-duct will be to promote a constant downward flow of the oil from the upper end of the sleeve I into the chamber L. In other words, the action of this spiral oil-duct will be in a direction to oppose the flow of the oil upward over the top of the sleeve I.

Within the lower portion of the casing A is mounted a bearing G', within which are mounted pads H', which are in communication with an oil-chamber N. Tightly fitted to the shaft J and mounted within the bearing G' is a bearing-sleeve O. The lower cap C is attached to the lower end of the casing A in any suitable manner to form a tight joint therewith and surrounds the lower portion of the casing A, so as to provide the oil-chamber N within the cap C and surrounding the sides and lower end of the casing A. Above the bearing G' and surrounding the bearing-sleeve O is an oil-chamber P. The bearing-sleeve O is provided internally with a spiral oil-duct $o$, leading downwardly from the upper end of the sleeve or dam $c$, which is preferably formed integrally with the lower cap C. A dust-deflector Q is rigidly attached to the shaft J at a point below and adjacent to the lower side of the cap C.

From the previous explanation the relation and operation of the pads at the lower end of the journal-box will be readily understood. In Fig. 4 I have shown the casing A provided with an oil-duct $m$, leading from the oil-chamber M direct to the oil-chamber F.

In addition to the advantages previously noted it will also be perceived that with my construction I provide a journal box and bearing so arranged that the shaft J, with the bearing-sleeve K O, is free to move vertically within the journal box and bearing. This will be recognized as of especial advantage in the construction of crushing-mills, where it is desirable that the crushing-rolls shall be free to rise over refractory material.

In order to further equalize the quantity of oil in the various oil-chambers, as well as to facilitate the feed of oil to the bearing G, I provide the bearing-sleeve K with an oil-duct $l$, which is preferably located adjacent to the upper end of the oil-chamber L, opposite one of the pads H. Of course more than one of these ducts may be provided, if desired. So, also, if desired, the pads H may be dispensed with wholly or in part, so as to leave an unobstructed opening for the flow of oil between the oil-chambers L and M. If desired, an oil-duct $x$ may be provided, leading downwardly from the chamber L—as, for instance, directly to the upper surface of the end-thrust bearing E, as shown in Fig. 1. With this arrangement the oil is free to circulate through the oil-chambers L, M, and F, passing from F to L, or vice versa, either by working its way between the bearing-sleeve K and the bearings E and G or by passing directly through the oil-ducts $x$ $m$ $m'$, or both. In like manner the flow of oil between the inner and outer divisions of the oil-chambers L M at the lower end of the bearing may be facilitated by means of the oil-duct $o'$.

In Fig. 5 I have shown a modified form of my device in which the bearing-sleeve K is elongated to rest upon an end-thrust bearing E', adjacent to the extreme bottom of the journal-box. The dam I' also extends to the bottom of the journal-box, where it is provided with lateral flanges, which are clamped between the disk C' and the casing A', the casing being provided, as before, with the upper and lower vertical bearings G and G' and being enlarged intermediate of the upper and lower bearings to provide an enlarged oil-chamber M'.

Having thus described my invention, what I claim, and desire to secure by Letters Patent, is—

1. In a journal-box, the combination with a bearing of a sleeve rotating on said bearing, a dam arranged within said sleeve, said sleeve being provided with an oil-duct leading to a point opposite said dam, and an oil-chamber leading from the bearing-surfaces of said sleeve and said bearing to the inner end of said duct, substantially as described.

2. A journal-box, comprising a casing containing two connected chambers, a dam fitted at one end within the passage connecting said chambers, and extending only into the uppermost of said chambers, a shaft to fit loosely within said dam whereby the oil will flow over said dam and into the lower chamber, substantially as described.

3. The combination with a shaft of a journal box and bearing, fitted within said journal-box, a bearing-sleeve fitted to said shaft and rotating within said journal-box, an annular dam surrounding said shaft and arranged within said bearing-sleeve, said sleeve-bearing provided with an oil-duct extending therethrough to a point opposite to said dam, and an oil-chamber arranged with reference to said bearing, to provide a passage from between the bearing-surfaces of said sleeve and said bearing to the inner end of said firstnamed oil-duct, substantially as described.

4. In a journal-box, the combination with a casing, comprising upper and lower chambers, of bearings arranged within said chambers and a bearing-sleeve, arranged to rotate within said bearing in one of said chambers and supported upon an end-thrust bearing, a shaft carried by said bearing-sleeve, a second bearing-sleeve rigidly secured to said shaft and arranged to rotate within the other of said chambers, an annular dam arranged within each of said bearing-sleeves, all arranged to provide an overflow-passage leading over the upper dam to the bearing in the lower chamber, substantially as described.

5. In a journal-box, the combination with a bearing of a shaft, an annular dam surrounding said shaft and extending upwardly to a point adjacent to the upper end of said bearing, a bearing-sleeve attached to said shaft and arranged to surround said dam and to rotate within said bearing, said bearing-sleeve being provided internally with a spiral oil-duct surrounding said dam and leading downwardly from a point adjacent to the upper end thereof, substantially as described.

6. In a journal-box, the combination with a bearing, of a shaft, an annular dam surrounding said shaft, a bearing-sleeve, attached to said shaft, arranged to surround said dam and to rotate within said bearing, and having its interior formed to provide an oil-chamber between said bearing-sleeve and said dam, and an oil-chamber surrounding said bearing, said bearing-sleeve being provided with oil-passages connecting said oil-chambers adjacent to their upper and lower ends, substantially as described.

7. In a journal-box, the combination with a vertical bearing and a horizontal bearing, of a shaft, a bearing-sleeve secured to said shaft, arranged to rotate within said vertical bearing and upon said horizontal bearing, and a lubricating means, substantially as described.

8. In a journal-box, the combination with a shaft, of a bearing, a bearing-sleeve attached to said shaft and supported upon said bearing, and means for lubricating the said shaft, substantially as described.

9. In a journal-box, the combination with a shaft, of a bearing, a bearing-sleeve attached to said shaft and arranged to support the same, a portion of said bearing-sleeve being arranged to surround a portion of said shaft without being in contact therewith, and means for lubricating the said shaft, substantially as described.

10. In a journal-box, the combination with the casing and the shaft arranged therein, of a bearing-sleeve secured to the said shaft, a bearing secured in said casing and encircling the said bearing-sleeve, a dam arranged with the said bearing-sleeve, and means for feeding the lubricant to the said shaft.

ALBERT RAYMOND.

Witnesses:
O. R. BARNETT,
M. E. SHIELDS.